United States Patent [19]
Hayami et al.

[11] Patent Number: 5,132,338
[45] Date of Patent: Jul. 21, 1992

[54] POWDER MIXTURE USED FOR POWDER METALLURGY

[75] Inventors: Takehiko Hayami, Moriguchi; Hitoshi Sakuma, Kobe; Jiro Chosokabe, Miki, all of Japan

[73] Assignee: Kabushiki Kaisha Kobe Seiko Sho, Kobe, Japan

[21] Appl. No.: 477,770

[22] Filed: Feb. 9, 1990

[30] Foreign Application Priority Data

Feb. 20, 1989 [JP] Japan .................................. 1-40659

[51] Int. Cl.$^5$ .............................................. B22C 1/00
[52] U.S. Cl. .................................. 523/139; 524/414; 524/420; 524/440
[58] Field of Search ............... 523/139; 524/440, 414, 524/420, 495, 560

[56] References Cited

U.S. PATENT DOCUMENTS

| | | | |
|---|---|---|---|
| 4,582,872 | 4/1986 | Hudgin et al. | 524/440 X |
| 4,596,841 | 6/1986 | Konishi et al. | 523/410 |
| 4,776,979 | 10/1988 | Kageyama | 624/440 X |
| 4,830,779 | 5/1989 | Maeno et al. | 524/440 X |
| 4,834,800 | 5/1989 | Semel | 524/440 X |
| 4,891,399 | 1/1990 | Ohkawa et al. | 524/440 X |

*Primary Examiner*—Joseph L. Schofer
*Assistant Examiner*—J. M. Reddick

*Attorney, Agent, or Firm*—Oblon, Spivak, McClelland, Maier & Neustadt

[57] ABSTRACT

A powder mixture used for powder metallurgy containing a metal powder as a substrate, in which a copolymer comprising the following monomer ingredients as a binder is blended:

| | |
|---|---|
| acrylic acid ester: | 20 to 70 parts by weight |
| methacrylic acid ester: | 80 to 30 parts by weight |
| polymerizable unsaturated acid: | 0.5 to 9 parts by weight based on 100 parts by weight of the sum for the acrylic ester and the methacrylic acid ester, | as a binder is blended therewith.

The powder mixture used for powder metallurgy is manufactured by mixing the starting powdery metal material with the starting powdery material for the physical property improving ingredient, adding the solution of the binder thereto and then applying stirring and drying.

Graphite segregation can be prevented without denaturing or reducing flow rate of the substrate metal and dusting upon handling can be suppressed.

7 Claims, 2 Drawing Sheets

POWDER MIXTURE USED FOR POWDER METALLURGY

BACKGROUND OF THE INVENTION

1. Field of the Invention

The present invention concerns a powder mixture used for powder metallurgy comprising a metal powder such as an iron powder or a steel powder as a substrate and a powder of alloying element, graphite, phosphorus, etc. mixed therewith as the ingredient for improving the physical property, in which a copolymer ingredient is incorporated at a specific composition ratio as a binder for suppressing the segregation of the physical property improving ingredient as described above without deteriorating the physical property of the metal powder as the substrate and suppressing dusting upon handling the powder.

2. Description of the Prior Art

In powder metallurgy using a metal powder such as an iron powder or a steel powder as the main starting material, a powder of alloying element such as copper, nickel, chromium or molybdenum, inorganic ingredient such as graphite, phosphorus or manganese sulfide (MnS) (hereinafter sometime referred to collectively as the physical property improving ingredient) for is often blended improving the physical property such as strength or fabricability of the sintering product. In this case, grain size, specific gravity, etc. are usually different considerably between the metal powder as the substrate and the powder of the physical property improving ingredient. For instance, if the metal powder as the substrate is an iron powder or a steel powder and the powder for the physical property improving ingredient is graphite or phosphorus, since the difference in the specific gravity is extremely great this tends to cause segregation in the course of handling from the mixing to molding steps causing to worsen the property and the homogenity of the sintering product.

As the means for preventing such segregation, there has been proposed a method of depositing a graphite powder, etc. to an iron or steel powder, etc. using an organic binder as disclosed in, for example, Japanese Patent Laid-Open Sho 56-136901 and Sho 63-103001.

However, the organic binder disclosed in Japanese Patent Laid-Open Sho 56-136901 is hydrophilic and, accordingly, involves a problem that it absorbs moisture to worsen the flow rate during storage or accelerates rusting of the metal powder as the substrate thereby worsening the quality of the sintering product. The organic binder as disclosed in Japanese Patent Laid-Open Sho 63-103001 shows a stronger effect of increasing the bonding force between iron or steel powder with each other rather than the bonding force of the iron or steel powder, for example, to the graphite powder and, accordingly, it has an insufficient effect for preventing the segregation of graphite. Then, a great amount of the binder has to be blended in order to attain an excellent effect and bonding (blocking) is inevitable between iron or steel powder with each other, making it necessary for a repulverization or sieving step after mixing and drying.

OBJECT OF THE INVENTION

The present invention has been made in view of the foregoing situation and it is an object thereof to provide a powder mixture used for powder metallurgy capable of preventing the segregation of graphite, etc. without causing denaturation or reduction of flow rate in the metal powder as the substrate or coagulation of the metal substrate to each other, as well as capable of suppressing the occurrence of dusting upon handling.

SUMMARY OF THE INVENTION

The foregoing object of the present invention can be attained by a powder mixture used for powder metallurgy comprising a metal powder as a substrate, in which a copolymer comprising the following monomer ingredients as a binder is blended:

| | |
|---|---|
| acrylic acid ester | 20 to 70 parts by weight |
| methacrylic acid ester | 80 to 30 parts by weight |
| polymerizable unsaturated acid | 0.5 to 9 parts by weight based on 100 parts by weight of the sum for the acrylic ester and the methacrylic acid ester. |

The copolymer described above per se has a commercial value as a binder of metal powder used for powder metallurgy.

The present inventors have made various studies for overcoming the foregoing problems in the prior art and, as a result, have confirmed that the foregoing problems can be dissolved altogether by using a specific ternary copolymer described above and segregation of graphite, etc. can effectively be prevented without causing denaturation or reduction of flow rate of the substrate metal, as well as occurrence of dusting upon handling the powder mixture which can also be suppressed.

DESCRIPTION OF THE ACCOMPANYING DRAWINGS

DESCRIPTION OF EXPERIMENT

The reason for defining the monomer composition in the ternary copolymer as a binder will be explained referring to the progress of the experiment.

Figure 1:
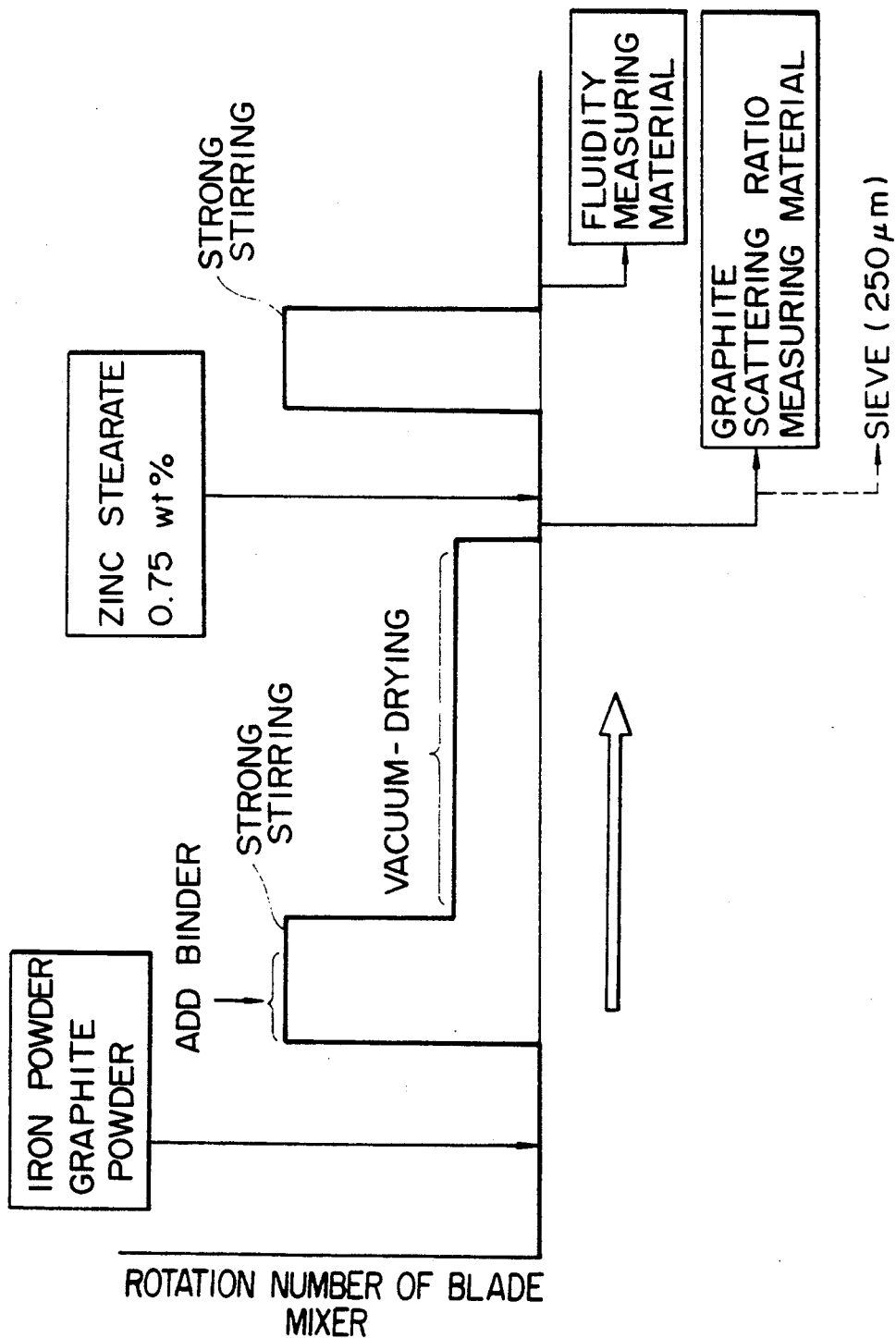
FIG. 1 is a flow chart showing the method of experiment.

In the experiment, iron powder ("Atomel 300M", trade name of product manufactured by the company of the applicant: grain size of less than 180 um) as a powder of substrate metal and graphite powder ("1651J" trade name of product manufactured by South Western Co.: average grain size of 2 um) as a physical property improving ingredient were used and mixed, one part by weight of the latter to 99 parts by weight of the former. As shown in FIG. 1 (flow chart), the starting powdery materials were stirred at a high speed by a blade mixer, to which an organic binder solution described later was dropped or sprayed. After stirring intensely for five min. stirring was switched to a moderate operation and they were vacuum-dried for a predetermined period of time to remove the solvent. Then, a portion of the dried powder was extracted for use as a specimen for the measurement of a graphite scattering ratio. The remaining dried powder was intensely stirred with the addition of a 0.75 wt % of zinc stearate as a lubricant to prepare a specimen for the measurement of flow rate.

Figure 2:
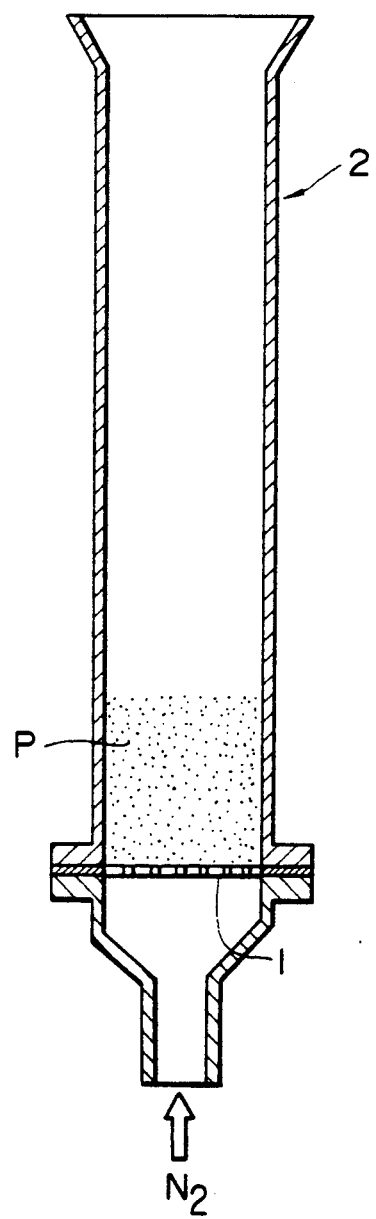
FIG. 2 is a cross sectional view for a tool used for the measurement of graphite scattering ratio.

For the measurement of the graphite scattering ratio, a funnel-like glass tube 2 (16 mm inner diameter and 106 mm height) attached with a filter ("Nuclepore", trade name of product manufactured by Nuclepore Corp.) 1 (pore size of 12 um) as shown in FIG. 2 was used, to which the specimen powder P (25 g) obtained as above was charged and N₂ gas was caused to flow from below for 20 min at a rate of 0.8 1/min to determine the graphite scattering ratio according to the following equation:

Graphite scattering ratio (%) =

$$\left(1 - \frac{\text{carbon amount after } N_2 \text{ passage}}{\text{carbon amount before } N_2 \text{ passage}}\right) \times 100$$

Further, flow rate was determined according to JIS-Z2502.

At first, the effect of the copolymerization ratio of the acrylic acid ester and the methacrylic acid ester constituting the binder on the graphite scattering ratio and the flow rate of the powder mixture was examined and the results are shown in Table 1.

a range from 20 to 70 parts by weight of the former to 80 to 30 parts of the latter.

However, the graphite scattering ratio and the flow rate obtained for the first time by the above-mentioned constitution is satisfactory only in view of laboratory scale but it can not be said to be sufficient in view of practical use. Then, as a result of a further study, the graphite scattering ratio can outstandingly be improved without reducing the flow rate by so much if an appropriate amount of a polymerizable unsaturated acid is added to the foregoing two ingredients to prepare a ternary copolymer. For instance, Table 2 shows the result of the effect given to the graphite scattering ratio and the flow rate when the butyl acrylate and methyl methacrylate monomer ratio is set to 40:60 (weight ratio) which is considered to be best and acrylic acid is copolymerized within a range of less than 11.1 parts to 100 parts by weight of the sum of the ingredients (part by weight). As apparent from the result, best graphite scattering ratio is obtained within a range of the acrylic acid from 0.5 to 9 parts and the flow rate is also satisfac-

TABLE 1

| Copolymerization composition (wt %) | | Binder | | Graphite scattering ratio (%) | Flow rate (sec/50 g) (Zn-St: additive) |
|---|---|---|---|---|---|
| | | Concentration of binder solution | Binder/powdery starting material | | |
| BA | MMA | (toluene solution: %) | (solid content: %) | (%) | |
| 100 | — | 5 | 0.1 | 5.8 | poor flow rate |
| 80 | 20 | 5 | 0.1 | 6.2 | poor flow rate |
| 70 | 30 | 5 | 0.1 | 6.3 | 34.3 |
| 60 | 40 | 5 | 0.1 | 6.5 | 32.1 |
| 40 | 60 | 5 | 0.1 | 7.0 | 28.6 |
| 20 | 80 | 5 | 0.1 | 7.5 | 27.2 |
| 10 | 90 | 5 | 0.1 | 9.4 | 27.0 |
| — | 100 | 5 | 0.1 | 12.0 | 26.4 |

BA: butyl acrylate
MMA: methyl methacrylate
Zn-St: zinc stearate (lubricant)

As apparent from Table 1, if the copolymerization tory within the above-mentioned range.

TABLE 2

| Copolymerization composition ratio | | | Binder | | Graphite scattering ratio (%) | Flow rate (sec/50 g) (Zn-St additive) | Remarks |
|---|---|---|---|---|---|---|---|
| | | | Concentration of binder solution | Binder/powdery starting material | | | |
| Butyl acrylate | Methyl methacrylate | Acrylic acid | (toluene solution: %) | (solid content: %) | | | |
| 60 | 40 | 0 | 5 | 0.1 | 6.5 | 32.1 | Comparative Example |
| 60 | 40 | 0.5 | 5 | 0.1 | 5.2 | 31.8 | Example |
| 60 | 40 | 1.0 | 5 | 0.1 | 4.5 | 31.8 | Example |
| 60 | 40 | 3.1 | 5 | 0.1 | 4.2 | 31.1 | Example |
| 60 | 40 | 5.3 | 5 | 0.1 | 4.0 | 30.7 | Example |
| 60 | 40 | 7.5 | 5 | 0.1 | 4.2 | 30.1 | Example |
| 60 | 40 | 8.7 | 5 | 0.1 | 5.1 | 29.8 | Example |
| 60 | 40 | 9.9 | 5 | 0.1 | 6.1 | 28.8 | Comparative Example |
| 60 | 40 | 11.1 | 5 | 0.1 | 6.3 | 27.0 | Comparative Example | ratio of the acrylic acid ester exceeds 70 parts (parts by weight here and hereinafter), the graphite scattering ratio is suppressed to provide a satisfactory result. However, the flow rate is reduced to worsen the flow rate of the powder mixture and results in a problem in view of the dustcore moldability. On the other hand, if the copolymerization ratio of the methacrylic acid ester exceeds 80 parts, the graphite scattering ratio can not be lowered sufficiently, and no satisfactory function as the binder can be obtained. Accoringly, for satisfying both of the graphite scattering ratio and the flow rate together the copolymerization ratio of the acrylic acid ester and the methacrylic acid ester has to be set within The preferred copolymerization composition of the binder used in the present invention is as described above. Upon using the binder, it has to be dispersed uniformly throughout the powder mixing system in the mixing step and it has to just cover the surface of the metal powder as the substrate and be effectively bonded with the powdery physical property improving ingredient. For this purpose, it is considered that the addition amount of the binder to the starting powdery material and the concentration of the binder are also important. In view of the above, a ternary copolymer of butyl acrylate:methyl methacrylate:acrylic acid = 57:38:5

(parts by weight) was used and the experiment was conducted for determining the effect of the toluene concentration or the addition amount on the graphite scattering ratio. In this experiment, the drying time ratio (time ratio when setting the binder solution concentration to 5% and assuming the drying time of the binder/starting powder material=0.1% as 1.00) giving an effect on the productivity was also examined.

The results are shown in Table 3

TABLE 3

| Concentration of binder solution (toluene solution) | Binder addition amount (%) | | | Amount of binder solution/powdery starting material (%) |
|---|---|---|---|---|
| | Binder/powdery starting material (solid content) | Graphite scattering ratio (%) | Drying time ratio | |
| 5 | 0.05 | 11.9 | 0.43 | 1.0 |
| | 0.08 | 5.4 | 0.72 | 1.6 |
| | 0.10 | 4.0 | 1.00 | 2.0 |
| | 0.12 | 3.6 | 1.25 | 2.4 |
| | 0.15 | 4.1 | 1.68 | 3.0 |
| | 0.20 | 6.8 | 2.36 | 4.0 |
| 2.5 | 0.03 | 9.8 | 0.42 | 1.2 |
| | 0.05 | 7.1 | 0.94 | 2.0 |
| | 0.10 | 5.0 | 2.04 | 4.0 |
| 10 | 0.10 | 5.8 | 0.51 | 1.0 |
| | 0.15 | 3.2 | 0.80 | 1.5 |
| | 0.20 | 1.2 | 1.08 | 2.0 |
| | 0.25 | 1.5 | 1.39 | 2.5 |
| 15 | 0.15 | 5.2 | 0.53 | 1.0 |
| | 0.30 | 0.8 | 1.16 | 2.0 |

As apparent from Table 3, upon adding the binder (ternary copolymer), the addition amount as the binder solution to the powdery starting material is extremely important as well as the solution concentration of the binder and the additon amount as the solid content to the starting powder material. If the addition amount is less than 1.6%, it is difficult to thoroughly and uniformly disperse the binder solution over the entire surface of the iron powder resulting in insufficient bonding thus failing to sufficiently suppress the segregation and the graphite scattering. On the other hand, if the amount exceeds 2.4%, the binder solution itself causes segregation in the mixture system to cause uneven mixing, partial insufficiency for the bonding force, failing to obtain an intended purpose. Accordingly, upon adding the binder, the addition amount as the solution is preferably adjusted within a range from 1.6 to 2.4% based on the powdery starting material. However, if the absolute amount as the solid content of the binder is insufficient, bonding force after drying is insufficient. On the other hand, if it is excessive, the powder is blocked to require pulverization. Accordingly, the addition amount as the solid content is set within a range preferably from 0.01 to 0.5% and, more preferably, from 0.05 to 0.3%. Further, since the preferred concentration of the binder solution varies depending on the molecular weight of the ternary copolymer (polymerization degree) and the solution viscosity in accordance therewith, it can not be defined generally but the concentration is usually defined as within a range from 1 to 15% and, more preferably, from 3 to 10%.

Then, Table 4 shows the results of examination for the graphite scattering ratio and the coagulation (residual rate on 250 um sieve), when a ternary copolymer comprising butyl acrylate:methyl methacrylate:acrylic acid = 57:38:5 (parts) was used and the solution concentration or the addition amount of the binder were changed variously in accordance with the foregoing procedures, as well as the flow rate and the compression property (for test specimen sized: 11.3 mm$\phi \times$ 10 mm$^h$, molding pressure at 5 ton/cm$^2$) when 0.75% of zinc stearate was additionally mixed thereto. In this table, appears the result of an example not adding the binder and an example of using methyl methacrylate homopolymer as the binder for the comparison.

TABLE 4

| Binder | Binder addition amount (%) | | Amount of solution/powdery starting material | Graphite scattering ratio (%) | Coagulation (250 um mesh +) | Flow rate | Compression property (5 ton/cm$^2$) moldability |
|---|---|---|---|---|---|---|---|
| | Concentration of binder solution (toluele solution) | Binder/powdery starting material | | | | | |
| Ternary copolymer | 4 | 0.08 | 2.0 | 4.9 | 0 | 30.9 | 6.90 |
| | 5 | 0.10 | 2.0 | 4.0 | 0 | 30.7 | 6.90 |
| | 5 | 0.20 | 4.0 | 6.8 | 0 | 30.2 | 6.89 |
| | 10 | 0.20 | 2.0 | 1.2 | 0 | 30.4 | 6.89 |
| | 10 | 0.30 | 3.0 | 2.2 | 2.4 | 29.2 | 6.84 |
| | 15 | 0.15 | 1.0 | 5.2 | 0 | 30.0 | 6.88 |
| | 15 | 0.30 | 2.0 | 0.8 | 3.6 | 28.4 | 6.83 |
| MMA homopolymer | 12.5 | 0.25 | 2.0 | 5.0 | 4.2 | 29.5 | 6.85 |
| with no addition | — | — | — | 58 | 0 | 34.4 | 6.89 |

As apparent also from Table 4, although the graphite scattering ratio without adding the binder was extremely great, the graphite scattering ratio was remarkably suppressed by the addition of an appropriate amount of the binder. When the MMA homopolymer was used as the binder, although the graphite scattering ratio could rather be suppressed by adding 2.25% as the solid content, partial coagulation occurred under the effect of the binder to form a considerable amount of coagulation product. On the contrary, when the ternary copolymer according to the present invention was used, the graphite scattering ratio as compared the case of using the MMA homopolymer could be obtained by merely adding, for example, 0.08% of a 4% toluene solution to the powdery starting material and no coagulation product was formed.

Although examples of using butyl acrylate as the acrylic acid ester, methyl methacrylate as the methacrylic acid ester and acrylic acid, respectively, are shown in the foregoing experiment, substantially the same effects can be obtained also in the case of using an acrylic acid alkyl ester such as methyl acrylate, ethyl acrylate, propyl acrylate, pentyl acrylate and hexyl acrylate, a methacrylic acid alkyl ester such as ethyl methacrylate, propyl methacrylate, butyl methacrylate and pentyl methacrylate, and a polymerizable unsaturated acid such as methacrylic acid, ethacrylic acid, itaconic acid, maleic acid or maleic acid anhydride as the monomer ingredient. Further, although the toluene solution was used as the binder solution in the foregoing example, it is also possible to use various organic solvents such as xylene, acetone, methyl ethyl ketone, cyclohexanone, methyl acetate, ethyl acetate, 1,4-dioxane and dichloroethylene in addition to toluene as the solvent for the binder.

Further, although the description has been made to the foregoing experimental example in the case of mixing a graphite powder as the physical property improving agent to the iron powder, it is also applicable to such a case of improving the iron powder or the steel powder by adding the allowing element, phosphorus manganese sulfite, etc.

Then, the physical property improving ingredient powder can be added within a range of less than 7% by weight based on the entire weight of the powder mixture. The preferred addition amount for each of the ingredients is: graphite$\leq$2% by weight, Cu$\leq$5% by weight, Ni$\leq$6% by weight, Cr$\leq$3% by weight, Mo$\leq$2% by weight, P$\leq$1% by weight, MnS$\leq$0.5% by weight.

The present invention having been constituted as described above can provide a powder mixture used for powder metallurgy of excellent performance, by using a specific ternary copolymer, without giving undesired effect on the powder of the substrate metal and improving the flow rate and the dusting resistance.

What is claimed is:

1. A powder mixture used for powder metallurgy containing a metal powder as a substrate, in which a copolymer comprising the following monomer ingredients as a binder is blended:

| | |
|---|---|
| acrylic acid ester: | 20 to 70 parts by weight |
| methacrylic acid ester: | 80 to 30 parts by weight |
| polymerizable unsaturated acid: | 0.5 to 9 parts by weight based on 100 parts by weight of the sum for the acrylic ester and the methacrylic acid ester. |

2. A powder mixture used for powder metallurgy as defined in claim 1, wherein the metal powder as the substrate comprises one or more powder(s) selected from an iron powder and a steel powder.

3. A powder mixture used for powder metallurgy as defined in claim 1 or 2, comprising the metal powder as the substrate and, blended therewith, one or more of members selected from copper, nickel, chromium, molybdenum, graphite, phosphorus and manganese sulfide as a powder of physical property improving ingredient.

4. A powder mixture used for powder metallurgy as defined in claim 1, wherein the acrylic acid ester is butyl acrylate.

5. A powder mixture used for powder metallurgy as defined in claim 1, wherein the methacrylic acid ester is methyl mechacrylate.

6. A powder mixture used for powder metallurgy as defined in claim 1, wherein the polymerizable unsaturated acid is acrylic acid.

7. A powder mixture used for powder metallurgy as defined in claim 1, wherein the amount of the binder as the solid content based on the powder mixture is from 0.01 to 0.5% by weight.

* * * * *